No. 878,661. PATENTED FEB. 11, 1908.
R. S. McLEOD.
SYSTEM OF ELECTRICAL DISTRIBUTION.
APPLICATION FILED JULY 11, 1904.
5 SHEETS—SHEET 1
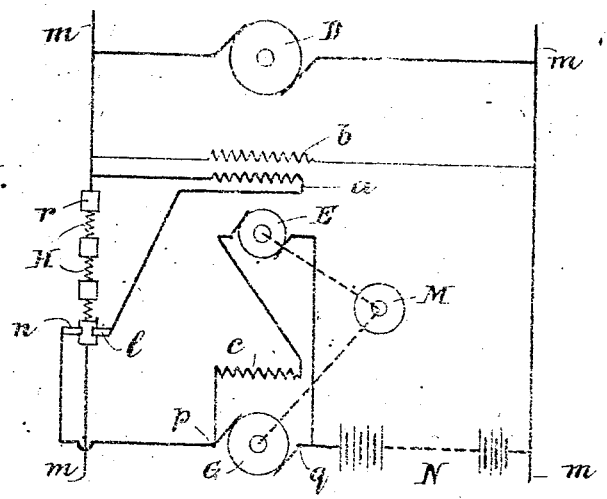
Fig. I.
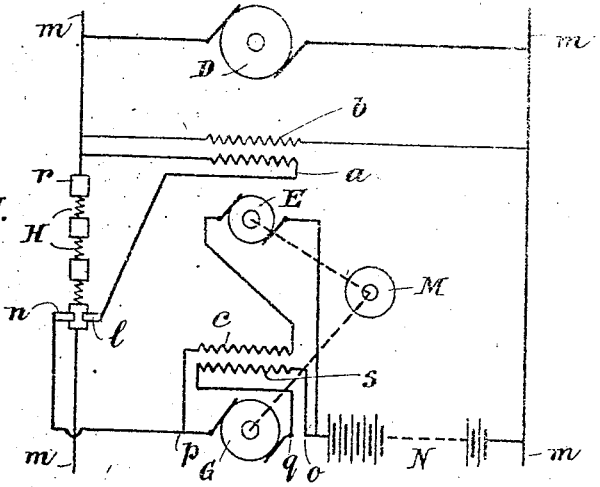
Fig. II.
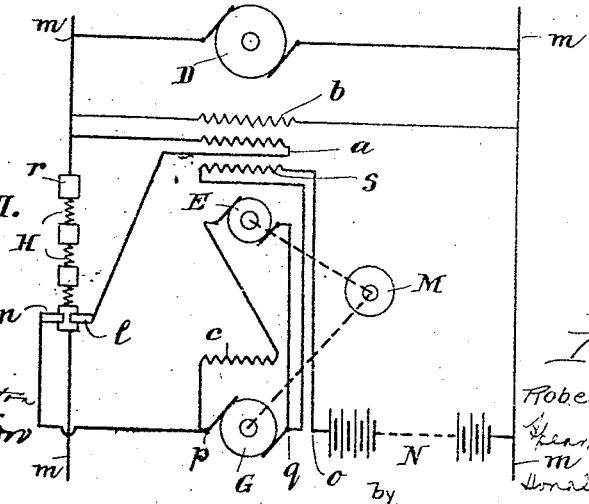
Fig. III.
Attest:
C.S. Middleton
Edward Sartor
Inventor
Robert S. McLeod
by Donaldson Spear
Atty.

No. 878,661. PATENTED FEB. 11, 1908.
R. S. McLEOD.
SYSTEM OF ELECTRICAL DISTRIBUTION.
APPLICATION FILED JULY 11, 1904.
5 SHEETS—SHEET 2.
Fig. IV.
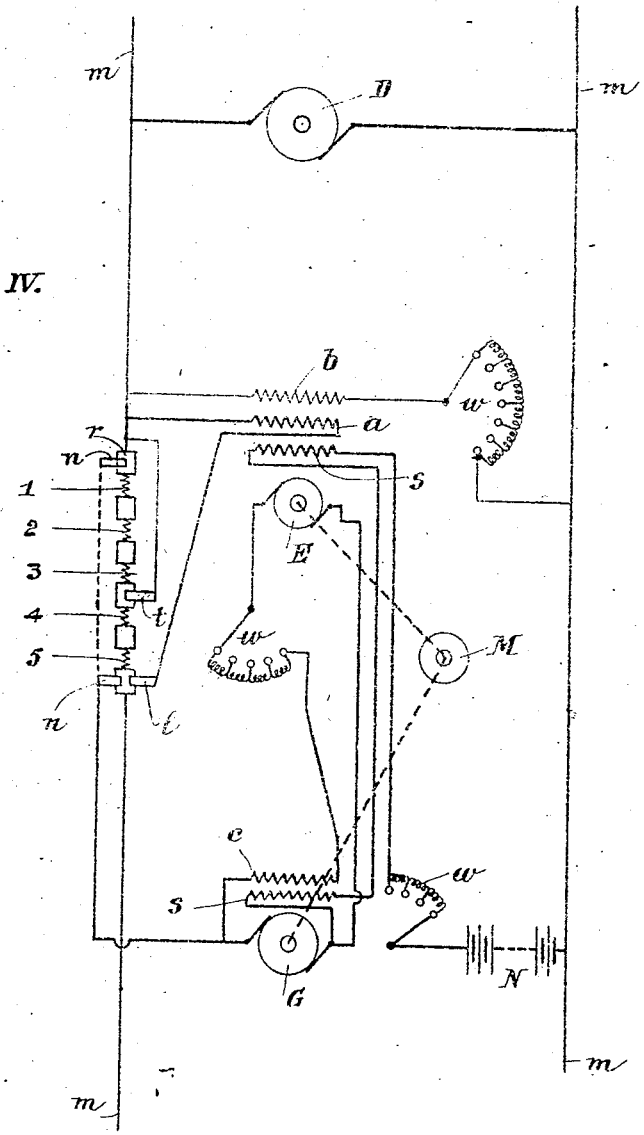
Attest.
C. S. Middleton
Edward Saxton
Inventor
Robert S. McLeod
By Spear, Middleton, Donaldson & Spear
Att'ys

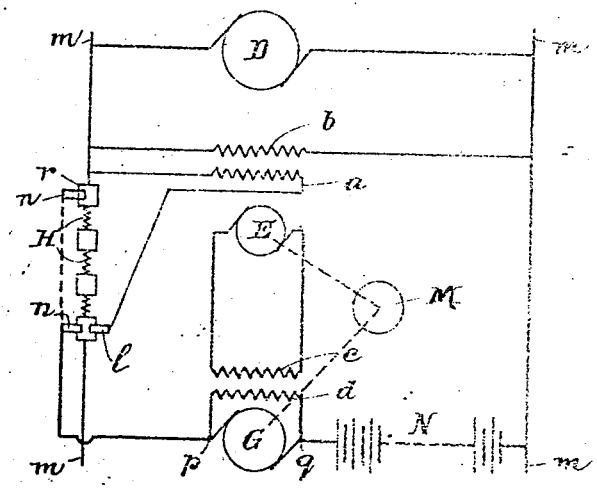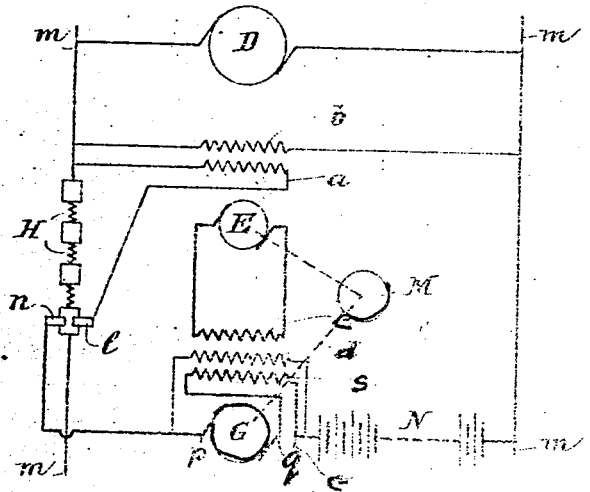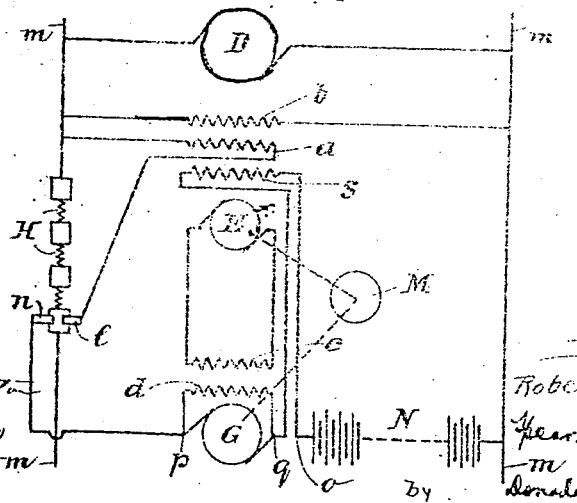

No. 878,661. PATENTED FEB. 11, 1908.
R. S. McLEOD.
SYSTEM OF ELECTRICAL DISTRIBUTION.
APPLICATION FILED JULY 11, 1904.
5 SHEETS—SHEET 4.
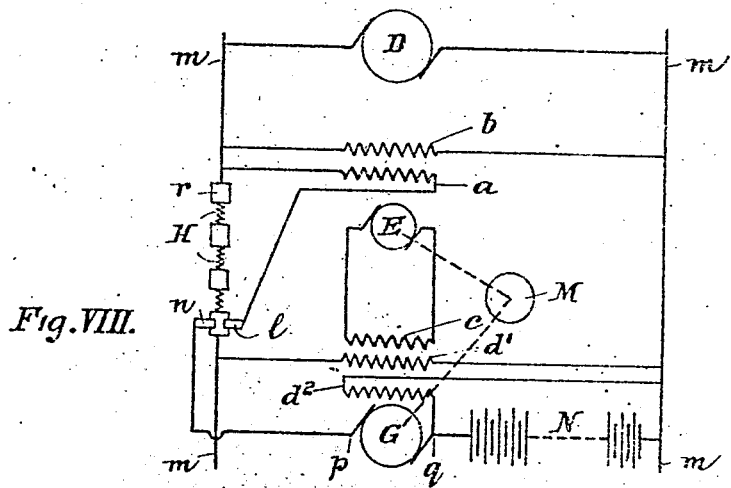
Fig. VIII.
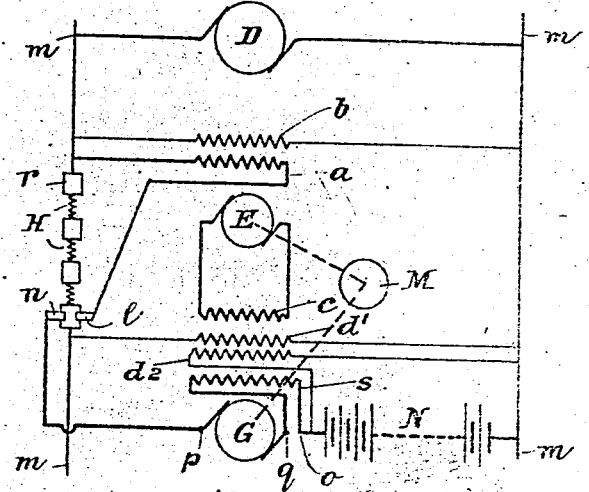
Fig. IX.
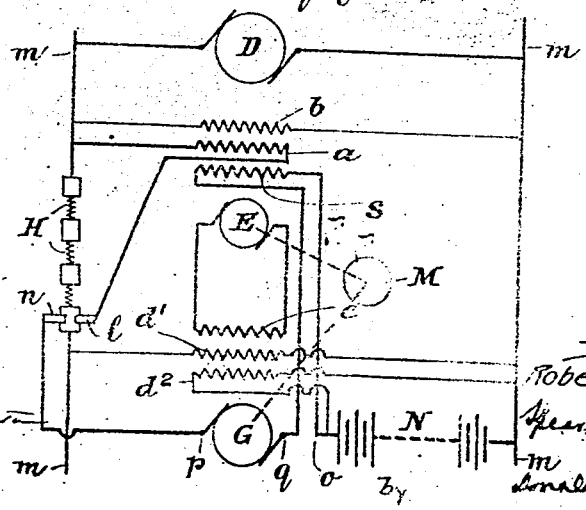
Fig. X.
ATTEST:
C. S. Minceau
C. Sarton
INVENTOR
Robert S. McLeod
by
Donaldson & Greer
Atty's No. 878,661.
PATENTED FEB. 11, 1908.
R. S. McLEOD.
SYSTEM OF ELECTRICAL DISTRIBUTION.
APPLICATION FILED JULY 11, 1904.
5 SHEETS—SHEET 5.
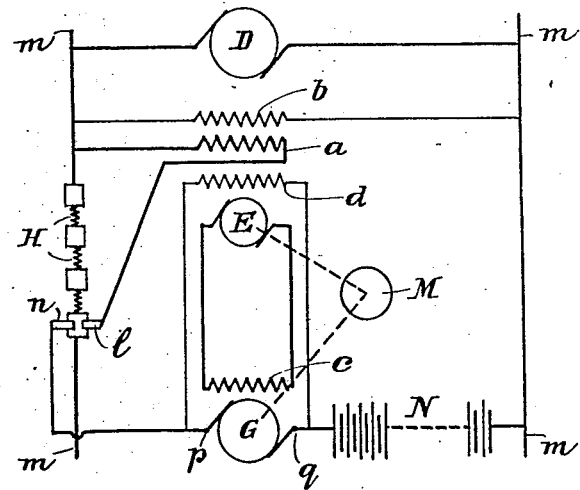
Fig. XI.
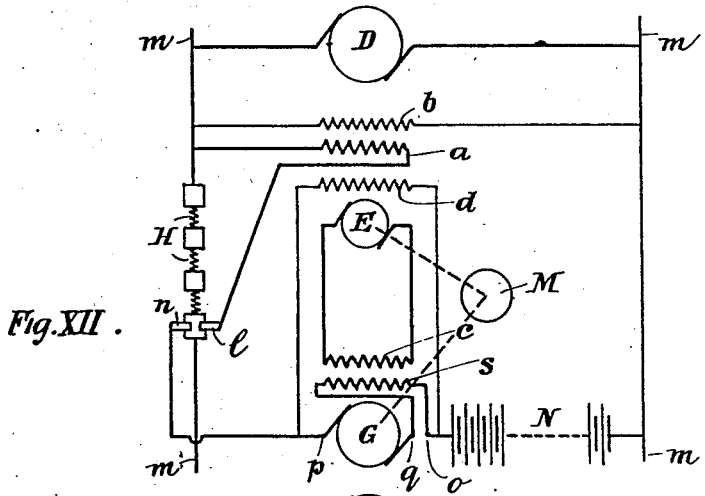
Fig. XII.
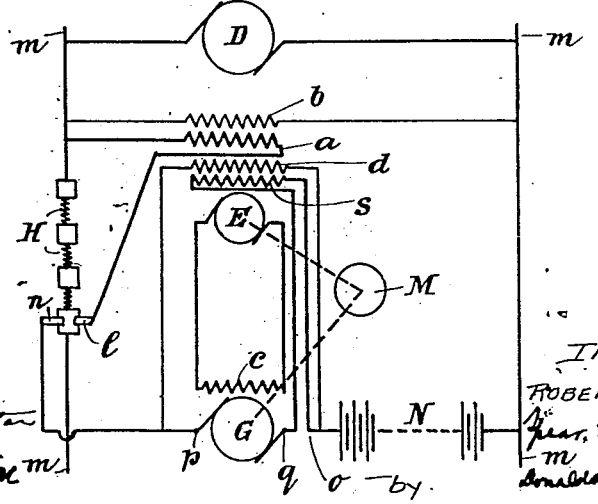
Fig. XIII.
ATTEST.
C. S. Meister
Edward Barton
INVENTOR.
ROBERT S. McLEOD
by Donaldson & Spear
Attys

UNITED STATES PATENT OFFICE.

ROBERT STAFFORD McLEOD, OF MANCHESTER, ENGLAND.

SYSTEM OF ELECTRICAL DISTRIBUTION.

No. 878,661.

Specification of Letters Patent.

Patented Feb. 11, 1908.

Application filed July 11, 1904. Serial No. 216,132.

*To all whom it may concern:*

Be it known that I, ROBERT STAFFORD McLEOD, a subject of the King of Great Britain, residing in Manchester, England, have invented certain new and useful improvements in systems of electrical distribution for regulating the charge and discharge of storage batteries used in combination with main generators, of which the following is a specification.

This invention relates to dynamo electric machines for regulating the charge and discharge of storage batteries; such apparatus comprises a reversible booster connected in series with the battery across the mains, a motor for driving the booster, and means to provide a field excitation such as to give at the booster terminals a voltage of such value and sign as may be necessary to enable the battery to discharge when the external load is greater than the normal output of the main generator, and to charge when the said load is less than the said output; in this way the booster serves to so regulate the battery as to tend to maintain a constant main generator output with a varying load.

My present invention has reference to the mode of exciting the booster field, and I have illustrated my invention in the accompanying drawings in which each of the figures is a diagrammatic representation of the windings and their connections to the mains, battery, booster, and exciter.

The booster and exciter are in each case driven by a motor at a fairly constant speed.

The booster and exciter may be of the usual construction common to such machines, except that the windings are arranged as hereinafter described; the fields are preferably laminated.

In the case of each of the field windings shown in the drawings, regulating resistances may be inserted in the well known manner to adjust the current in such windings, and these resistances may be arranged in series with the windings, or in parallel with them as diverting resistances. These resistances with the exception of H are for clearness omitted from the drawings, as their mode of connection is well known.

In each of the figures, D is the main generator, E the exciter, G the booster, N the battery, and M the motor.

The booster G and the exciter E are driven by the motor M and the windings and connections are as follows:—The booster G and the battery N are connected in series across the mains $m$ fed by the generator D, there will therefore be a voltage between the booster terminals $p$ and $q$ equal to the difference of voltage between the mains and the battery. The exciter field has two windings, the one $a$ adapted to carry a current which varies as the main current, and the other $b$ a current which varies as the main voltage; these currents are in opposition, and the exciter voltage will thus vary as the differential effect of these two windings.

The booster field is excited by the joint effect of two voltages, that of the exciter and that equal to the difference between the main and battery voltages; these two voltages may both be applied to the one winding $c$, as in Figures I to IV, or there may be two windings, one $c$ connected to the exciter terminals, and one $d$ connected to the booster terminals $p$ and $q$, as in Figs. V to VII. Where the two voltages are applied to the one winding $c$ the connections are such that the voltage of the exciter when the coil $a$ preponderates, and the voltage between $p$ and $q$ when the battery volts are lower than the main volts and the battery is discharging, are in the same sense and magnetize the booster field so that under the said conditions the booster voltage helps the battery discharge. When two windings $c$ and $d$ are employed, these under the above mentioned conditions both tend to magnetize the booster field so that the booster voltage helps the battery discharge.

As the battery current increases in magnitude the volts lost in the booster armature of course increase, and in order to compensate for this loss I find it convenient to add a few series turns $s$, in series with the battery, either on the booster field as in Figs. II and VI, or on the exciter field as in Figs. III and VII, or on both exciter and booster, as in Fig. IV.

The winding $d$ it will be seen has a voltage across the ends equal to that between $p$ and $q$, which is equal to the difference between that of the mains and that of the battery, and the same effect would therefore be produced if, instead of a single winding $d$, two windings $d^1$ and $d^2$ were fitted, connected respectively across the mains, and across the battery; this arrangement is shown in Figs.

VIII, IX, and X, which are views analogous to Figs. V, VI and VII.

The two windings $d^1$ and $d^2$ are so wound and connceted that they have the same effect in relation to the other windings as the single winding $d$ already described.

In a modification the winding $d$ connected across the booster terminals may be fitted on the exciter field and its effect on the booster volts produced indirectly by its influence on the exciter; this arrangement is shown in Figs. XI, XII and XIII, which are analogous views to Figs. VIII, IX and X, and in which, as in the latter figures, the winding $s$ is shown on the booster or on the exciter respectively.

When the winding $d$ is fitted on the exciter it is so wound and connected as to have the same effect in relation to the other windings as that produced when it is fitted on the booster in the manner described.

The current in the coil $a$ may be the whole main current or a definite part thereof shunted by the diverting resistance H; and in each case the end $l$ of the winding $a$ and the end $n$ of the connection to the booster terminal $p$ are arranged to slide on contacts provided in the resistance H, so that $n$ may be joined to the main at either end of H or at an intervening point, and so that by moving $l$ more or less of H may be included as a diverting resistance.

It will be seen that when the slider $n$ is in the position shown in the drawings, the magnetizing effect of the coil $a$ will be proportional to the main current on the side of the battery next the generating means, but that when, as shown in dotted lines in Fig. IV, $n$ is moved to the contact $r$ (the slider $l$ remaining in the position shown) the said magnetizing effect of the coil $a$ will be proportional to the main current on the side of the battery remote from the generating means; $n$ can also be placed in intermediate positions and the proportion in the coil $a$ of the main current may thus be adjusted.

The windings connected to the booster terminals may be connected across the terminals $p$ and $q$ of the booster as shown in Fig. I or across the terminals $p$ and $o$ the effect being practically the same in each case.

I have shown in Fig. IV an arrangement of the diverting resistance H which I have found convenient in practice, and in which the amount of the resistance H in the circuit may be regulated by short-circuiting more or less of H by means of a short-circuiting slider $t$; in Fig. IV the resistances 1, 2 and 3, are short-circuited so that only the resistances 4 and 5 are used to divert the current through the winding $a$; if $t$ be moved to $r$ then the whole of H is used as a diverting resistance; the resistance 1 is usually exceedingly high so that when $t$ is on $r$ practically the whole current goes through the winding $a$.

The arrangement is shown diagrammatically.

Rheostats $w$ may be inserted in the various windings if necessary for the purposes of adjustment.

It is to be understood that I make no broad claim herein to the use on a booster field of a winding such as $d$ in combination with current and voltage windings, as this forms the subject matter of a prior United States Patent granted to me, and numbered 737,764.

Having now fully described my invention, I declare that what I claim and desire to secure by Letters Patent is:—

1. In apparatus such as herein described, in combination with a main generator and a storage battery:—a booster the armature of which is connected in series with the battery across the mains, an exciter, and means for driving the exciter and the booster, the said exciter field being magnetized by a magnetizing force proportional to the main current and to the main voltage, and the said booster field being magnetized by a magnetizing force proportional to the exciter voltage and to the difference of voltage between the mains and the battery; substantially as described.

2. In apparatus such as herein described, in combination with a main generator and a storage battery:—a booster the armature of which is connected in series with the battery across the mains, an exciter, and means for driving the exciter and the booster, the said exciter field being magnetized by a magnetizing force proportional to the main current and to the main voltage, and the said booster field being magnetized by a magnetizing force proportional to the exciter voltage, to the difference of voltage between the mains and the battery, and to the battery current; substantially as described.

3. In apparatus such as herein described, in combination with a main generator and a storage battery:—a booster the armature of which is connected in series with the battery across the mains, an exciter, and means for driving the exciter and the booster, the said exciter field being magnetized by a magnetizing force proportional to the main current, to the main voltage, and to the battery current, and the said booster field being magnetized by a magnetizing force proportional to the exciter voltage and to the difference of voltage between the mains and the battery; substantially as described.

4. In apparatus such as herein described, in combination with a main generator and a storage battery:—a booster the armature of which is connected in series with the battery across the mains, an exciter, and means for driving the exciter and the booster, the said exciter field being magnetized by a magnetizing force proportional to the main current, to the main voltage, and to the battery current, and the said booster field being magnetized by a magnetizing force proportional to the exciter voltage, to the difference of voltage between the mains and the battery, and to the battery current; substantially as described.

5. In apparatus such as herein described, in combination with a main generator and a storage battery:—a booster the armature of which is connected in series with the battery across the mains, an exciter, and means for driving the exciter and the booster, the said exciter field having a shunt winding across the mains and a series winding connected to the ends of a diverting resistance in the main circuit, and the said booster field having a winding connected to the exciter terminals and to the booster terminals; substantially as described.

6. In apparatus such as herein described, in combination with a main generator and a storage battery:—a booster the armature of which is connected in series with a battery across the mains, an exciter, and means for driving the exciter and the booster, the said exciter field having a shunt winding across the mains and a series winding connected to the ends of a diverting resistance in the main circuit, and the said booster field having a winding connected to the exciter terminals and to the booster terminals, and a winding in series with the battery; substantially as described.

7. In apparatus such as herein described, in combination with a main generator and a storage battery:—a booster the armature of which is connected in series with the battery across the mains, an exciter, and means for driving the exciter and the booster, the said exciter field having a shunt winding across the mains, a series winding connected to the ends of a diverting resistance in the main circuit, and a winding in series with the battery, and the said booster field having a winding connected to the exciter terminals and to the booster terminals; substantially as described.

8. In apparatus such as herein described, in combination with a main generator, a storage battery, an exciter, and a booster,—a diverting resistance in the main circuit having contacts and three sliders connected respectively to the series coil on the exciter, a terminal of the booster and a short circuiting conductor; substantially as described.

In testimony whereof I have hereunto set my hand in the presence of two subscribing witnesses.

ROBERT STAFFORD McLEOD.

Witnesses:
    JOHN HARRY WILD,
    GEORGE ERIC MASON.